United States Patent
Lee et al.

(10) Patent No.: US 9,121,493 B2
(45) Date of Patent: Sep. 1, 2015

(54) APPARATUS FOR ACTUATING SHIFT LEVER FOR VEHICLE

(71) Applicants: Hyundai Motor Company, Seoul (KR); Kia Motors Corporation, Seoul (KR)

(72) Inventors: Chang Hyun Lee, Seoul (KR); Han Gil Park, Suwon-si (KR); Yang Rae Cho, Suwon-si (KR)

(73) Assignees: HYUNDAI MOTOR COMPANY, Seoul (KR); KIA MOTORS CORP., Seoul (KR)

( * ) Notice: Subject to any disclaimer, the term of this patent is extended or adjusted under 35 U.S.C. 154(b) by 0 days.

(21) Appl. No.: 14/096,870

(22) Filed: Dec. 4, 2013

(65) Prior Publication Data

US 2015/0040708 A1 Feb. 12, 2015

(30) Foreign Application Priority Data

Aug. 9, 2013 (KR) .......................... 10-2013-0094807

(51) Int. Cl.
| | |
|---|---|
| *B60K 17/04* | (2006.01) |
| *B60K 17/12* | (2006.01) |
| *F16H 59/08* | (2006.01) |
| *F16H 59/02* | (2006.01) |
| *F16H 59/10* | (2006.01) |

(52) U.S. Cl.
CPC ............ *F16H 59/08* (2013.01); *F16H 59/0204* (2013.01); *F16H 59/10* (2013.01); *F16H 2059/0295* (2013.01)

(58) Field of Classification Search
CPC ..................... Y10T 74/2003; Y10T 74/20018; Y10T 74/2014; F16H 59/0204; F16H 59/02; F16H 59/10; F16H 59/04; F16H 63/3458
USPC ................. 74/473.1, 473.12, 473.18, 473.32, 74/473.35
See application file for complete search history.

(56) References Cited

U.S. PATENT DOCUMENTS

| | | | |
|---|---|---|---|
| 5,899,115 A | 5/1999 | Kataumi et al. | |
| 7,530,285 B2 | 5/2009 | Rettenmaier et al. | |
| 8,413,536 B2 * | 4/2013 | Giefer et al. | 74/473.3 |
| 2003/0172762 A1 * | 9/2003 | Ehrmaier et al. | 74/473.33 |
| 2006/0053930 A1 * | 3/2006 | Morita et al. | 74/473.18 |
| 2011/0132124 A1 * | 6/2011 | Park et al. | 74/473.18 |
| 2014/0216194 A1 * | 8/2014 | Lindner et al. | 74/473.12 |

FOREIGN PATENT DOCUMENTS

| | | |
|---|---|---|
| JP | 10-193998 A | 7/1998 |
| JP | 2004-26131 A | 1/2004 |
| KR | 10-2005-0110990 A | 11/2005 |
| KR | 10-2011-0062888 A | 6/2011 |

* cited by examiner

*Primary Examiner* — Justin Krause
(74) *Attorney, Agent, or Firm* — Morgan, Lewis & Bockius LLP

(57) ABSTRACT

An apparatus for actuating a shift lever for a vehicle may include a shift pattern unit that has two reference ranges in series at which the position of the shift lever is fixed and a passageway connecting the reference ranges for the shift lever to move, and a driving unit that provides the restoration force to the shift lever to selectively return the shift lever to one of the reference ranges when the shift lever is located on the passageway outside of the reference ranges.

17 Claims, 3 Drawing Sheets

APPARATUS FOR ACTUATING SHIFT LEVER FOR VEHICLE

CROSS-REFERENCE TO RELATED APPLICATION

The present application claims priority of Korean Patent Application Number 10-2013-0094807 filed on Aug. 9 2013, the entire contents of which application are incorporated herein for all purposes by this reference.

BACKGROUND OF INVENTION

1. Field of Invention

The present invention relates, in general, to an apparatus for actuating a shift lever in an automatic transmission for a vehicle, in which the transmission has a conventional shift pattern and a shift distance of the shift lever is made shorter in order to improve precision in shift of gears.

2. Description of Related Art

Generally, the shift of gears in a vehicle is performed by a transmission which transmits the drive force from an engine to wheels while changing speed with the actuation of a shift lever. Generally, the shift lever has a variety of shift patterns, and the shift of gears is carried out by actuating the shift lever according to shift patterns.

Shift patterns exist in automatic transmissions as well as manual transmissions, and the shift patterns differ for every manufacturer for shift levers and transmissions. Generally, automatic transmissions have a shift pattern that has the layout of P-N-R-D or the layout further having speed ranges of 3-2-1 after the D range.

Further, recently developed shift-by-wire (SBW) levers may have unique shift patterns unlike existing mechanical shift levers. That is, since the SBW levers are actuated in an electronic mode, the SBW levers may have different shift patterns from a conventional pattern so that, for example, a P range and an N range may be located at the same position.

Because of such a difference in the shift pattern of the SBW lever from that of an existing mechanical shift lever, users may feel the system is foreign or inconvenient. Even if the SBW lever takes the same shift pattern as a mechanical shift lever in order to solve this problem, the distance between speed ranges needs to be narrowed owing to restrictions in space, so a shift error may occur in which, for example, when a driver tries to shift gear from a P range to an R range, the gear is shifted from the P range to an N range instead of the R range.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art, and the present invention provides an apparatus for actuating a shift lever for a vehicle, which allows the distance between speed ranges to be widened while having the same shift pattern as that of a conventional mechanical shift lever.

One aspect of the present invention provides an apparatus for actuating a shift lever for a vehicle that may include: a shift pattern unit having two reference ranges in series, at which the position of the shift lever is fixed, and a passageway connecting the reference ranges for the shift lever to move; and a driving unit providing the restoration force to the shift lever to selectively return the shift lever to one of the reference ranges when the shift lever is located on the passageway outside of the reference ranges.

The apparatus may further include a parking switch to be manipulated by a user and a control unit controlling the driving unit to forcedly move the shift lever to any one of the two reference ranges with the operation of the driving unit when the parking switch is manipulated. The reference ranges may include a first reference range serving as a parking range and a second reference range connected with the first reference range.

The passageway may include a forward passageway connected with the first reference range and along which the shift lever is able to move forward by one range stage, and a rearward passageway connected with the second reference range and along which the shift lever is able to move rearward by two range stages. While moving along the forward passageway, the shift lever may be returned to the first reference range by the driving unit, and while moving along the rearward passageway, the shift lever may be returned to the second reference range by the driving unit. The forward passageway may be configured such that the shift lever is able to move forward further by an additional range stage.

The shift pattern unit may further have a manual range connected with the second reference range apart from the rearward passageway and along which the shift lever is able to move laterally by one range stage to enter a manual shift mode.

When positioned at any one range of the first and second reference ranges and the manual range, the shift lever may be moved to the first reference range by the driving unit when the parking switch is manipulated. When the shift of the gear is completed by the operation of the parking switch while the shift lever is positioned at the first reference range, the control unit may control the driving unit to move the shift lever forward by one range stage followed by moving the shift lever to the first reference range.

According to the apparatus of the present invention for actuating the shift lever for a vehicle, the shift pattern thereof can be set to the same shift pattern as in a conventional mechanical shift lever, allowing a driver to correctly actuate the shift lever and therefore improving the operability of the apparatus. Further, the shift lever may have 5 to 6 operable range stages or some other number of operable range stages so that the distance between range stages can be enlarged within the same space, considerably reducing occurrence of a shift error.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
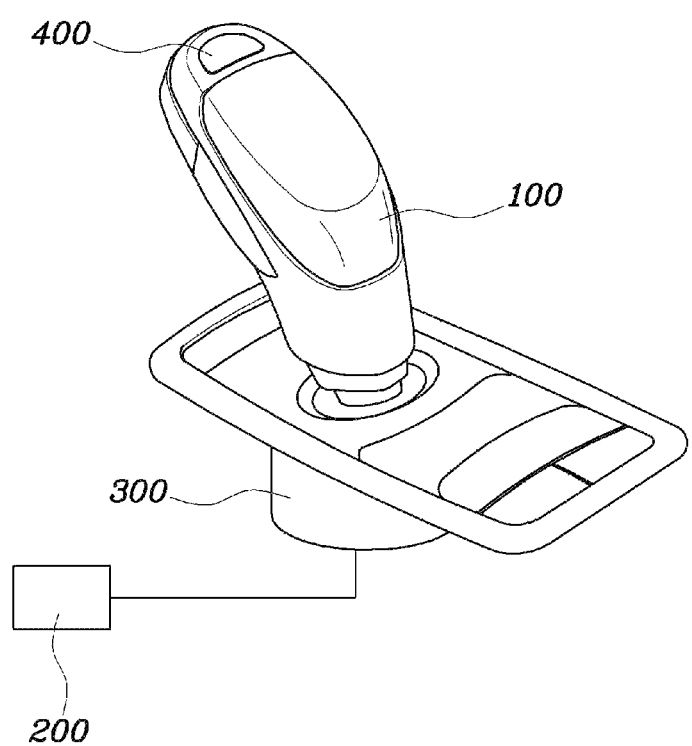
FIG. 1 is a view showing the construction of an apparatus for actuating a shift lever for a vehicle according to a first embodiment of the present invention.

FIG. 1 is a view showing the construction of an apparatus for actuating a shift lever for a vehicle according to a first embodiment of the present invention. The apparatus includes a shift pattern unit which has two reference ranges in series, at which a position of the shift lever 100 is fixed, and a passageway for the shift lever 100 which connects the reference ranges; and a driving unit 300 which provides the restoration force to the shift lever 100 to return the shift lever 100 to the reference ranges when the shift lever 100 is located on the passageway outside of the reference ranges.

Specifically, the apparatus may further include a parking switch 400 to be manipulated by a user; and a control unit 200 which controls the driving unit 400 to forcedly move the shift lever 100 to any one of the two reference ranges with the operation of the driving unit 400 when the parking switch 400 is manipulated.

The parking switch 400 may be located at any side of the shift lever 100, and when the parking switch 400 is manipulated, the shift lever 100 is always moved to a predefined position by the driving unit 300, irrespective of which position between the two reference ranges the shift lever 100 is currently positioned.

The driving unit 300 may be a motor, but may not be limited thereto. For example, the driving unit may be a hydraulic unit which has a hydraulic channel at a lower side of the shift lever 100 through which hydraulic force is exerted to move the shift lever to a predefined position.

The reference ranges may include a first reference range serving as a parking range and a second reference range connected with the first reference range. The second reference range may be connected directly with the first reference range so as to move thereto by only one manipulation thereof.

The passageway may include a forward passageway connected with the first reference range and along which the shift lever 100 is able to move forward by one range stage, and a rearward passageway connected with the second reference range and along which the shift lever 100 is able to move rearward by two range stages.

Here, the forward direction means the direction that is opposite the second reference range based on the first reference range, and the rearward direction means the direction that is opposite the first reference range based on the second reference range. That is, referring to FIG. 2, the forward direction is an upward direction from the first reference range in the illustration, and the rearward direction is a lower direction from the second reference range in the illustration.

In various embodiments, the configuration is such that the shift lever 100 is able to move forward by one range stage and rearward by two range stages, with the result that the shift lever 100 can be finally moved along 5 range stages including the first and second reference ranges.

With 5 limited range stages, the distance between adjacent range stages can be sufficiently secured within a restricted space in which the shift lever can be moved, thereby preventing a shift error of the shift lever in which, for example, when a driver tries to move the shift lever rearward by only one range stage, the shift lever is incorrectly moved rearward by two range stages. Particularly in the case of a SBW type electronic shift lever, it is preferred that an occupation space of a shift lever be made narrower and that the actuation distance of the shift lever be made smaller, so the electronic shift lever has narrower occupation space than that of a conventional mechanical shift lever. Therefore, the apparatus of the present invention has an improved effect on such an electronic shift lever.

By way of illustration, the first embodiment employs 5 limited range stages, but the present invention is not limited thereto. In the case of 5 limited range stages, it is preferred that the shift lever be moved therealong in order of P-R-N-D. That is, range stages may respectively correspond to a parking range that belongs to the first reference range, an R range that belongs to the second reference range, an N range that belongs to a range stage rearwards one stage from the second reference range, and a D range that belongs to a range stage rearwards two stages from the second reference range.

However, the respective range stages do not essentially have their own predefined range. This is because, during forward and rearward movement of the shift lever 100, the shift lever 100 can be returned to the first reference range and the second reference range, respectively, by the operation of the driving unit 300. Here, the shift may be returned to the first or second reference range with the action of an elastic member which is separately mounted, or the operation of a motor.

Figure 2:
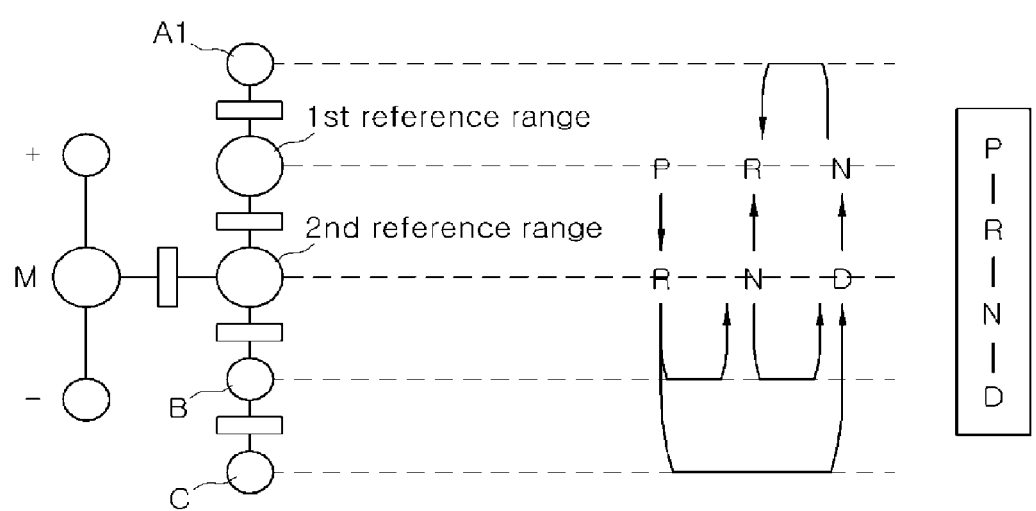
FIG. 2 is a view showing a shift pattern of the apparatus of the first embodiment of the present invention.

More specifically, referring to FIG. 2 showing a shift pattern of the apparatus of the first embodiment of the present invention, the shift lever 100 is moved along range stages in the order of P-R-N-D which correspond to a parking range at the first reference range, an R range at the second reference range, an N range at a stage rearward one stage from the second reference range, and a D range at a stage rearward two stages from the second reference range. Here, when the shift lever is moved one stage (referred to as a 'B' stage or range) or two stages (referred to as a 'C' stage or range) rearward from the second reference range, the shift lever is always returned to the second reference range. That is, when the shift lever 100 is moved to the N range, the shift lever 100 is located at the B stage and then is returned to the second reference range with the operation of the driving unit 300. Here, although the shift lever 100 is moved, the shift of the gear is still held in the N range.

When trying to shift gear to the D range, starting from the first reference range, the shift lever 100 is moved to the C range, and then is returned to the second reference range, being held in the D range.

Since the shift from the P range to the R range corresponds to the movement of the shift lever from the first reference range to the second reference range, the shift lever 100 becomes located at the second reference range, so that the shift lever can remain at the second reference range without returning to the first reference range with the operation of the driving unit 300.

Alternatively, there may be a case where a driver tries to shift the shift lever, which was returned to the second reference range by the driving unit 300 after gear-shifted to the N range, to the D or R range. Since the shift to the D range is performed by moving the shift lever 100 one stage rearward from the second reference range according to the order of P-R-N-D, the shift lever 100 is moved to the B stage from the second reference range, being gear-shifted to the D range, and then is returned to the second reference range.

On the other hand, in the case of the shift to the R range, the shift lever 100 is moved from the second reference range to the first reference range, being held in the R range, but is not returned to the second reference range by the driving unit 300. This is because the previous range of the R range is the P range, and the P range is driven only with the operation of the parking switch 400 via the movement to the first reference range, so the movement to the second reference range is not required.

Also in the case where the shift lever 100 is located at the second reference range in a state being gear-shifted to the D range, when gear-shifted to the N range, the shift lever 100 is moved to the first reference range, but is not returned to the second reference range thereafter. This is because the previous range of the N range is the R range, and the shift to the previous range, excluding the P range, is only possible by one range stage, so the provision of one range stage (referred to as a 'A1' range or stage) in the forward direction is sufficient for the shift to the previous range, which does not require the movement to the second reference range.

In the case where the shift lever 100 is located at the first reference range in a state being gear-shifted to the N range, since the shift to the R range is performed by moving the shift lever upward by one stage, the shift lever 100 is moved to the A1 range, being gear-shifted to the R range, and then is returned to the first reference range by the driving unit 300.

In the meantime, the shift pattern unit may further have a manual range M which is connected with the second reference range apart from the rearward passageway and along which the shift lever is able to laterally move by one range stage to enter a manual shift mode. Here, the lateral direction means the third direction, i.e. any direction, other than the forward and rearward directions. However, as shown in FIG. 2, the lateral direction may be perpendicular to the forward and rearward directions in order to facilitate the manipulation of the shift lever 100.

The manual range M is provided for the manual manipulation of the shift of gears. The manual range may have a separate passageway that is connected with the manual range M such that the shift lever 100 can be moved forward and rearward directions, respectively, by one range stage.

Further, when positioned at any one range of the first and second reference ranges and the manual range, the shift lever 100 may be moved to the first reference range by the driving unit 300 when the parking switch 400 is manipulated. That is, if the shift lever 100 is located at the second reference range, irrespective of the fact at which position is the shift lever currently located among the range stages, the shift lever 100 is moved to the first reference range with the operation of the driving unit 300 when the parking switch 400 is manipulated. Here, even if the shift lever 100 is located at the manual range M, the shift lever 100 is moved to the first reference range with the operation of the driving unit 300 when the parking switch 400 is manipulated. Thus, irrespective of which position the shift lever 100 is currently located among the range stages, the shift lever can be always located at the first reference range when the parking switch 400 is manipulated.

Particularly, when the shift of gear is completed by the operation of the parking switch 400 while the shift lever 100 is positioned at the first reference range, the control unit 200 may control the driving unit 300 to move the shift lever 100 forward by one range stage followed by moving the shift lever to the first reference range. This allows a driver to recognize that a currently shifted range is the P range. Here, the control unit 200 additionally detects, from a transmission controller such as TCU or the like, a shift signal indicating that the shift lever has been gear-shifted to the P range, and as described above, can control the driving unit 300 to move the shift lever 100 forward by one range stage followed by moving the shift lever to the first reference range.

Figure 3:
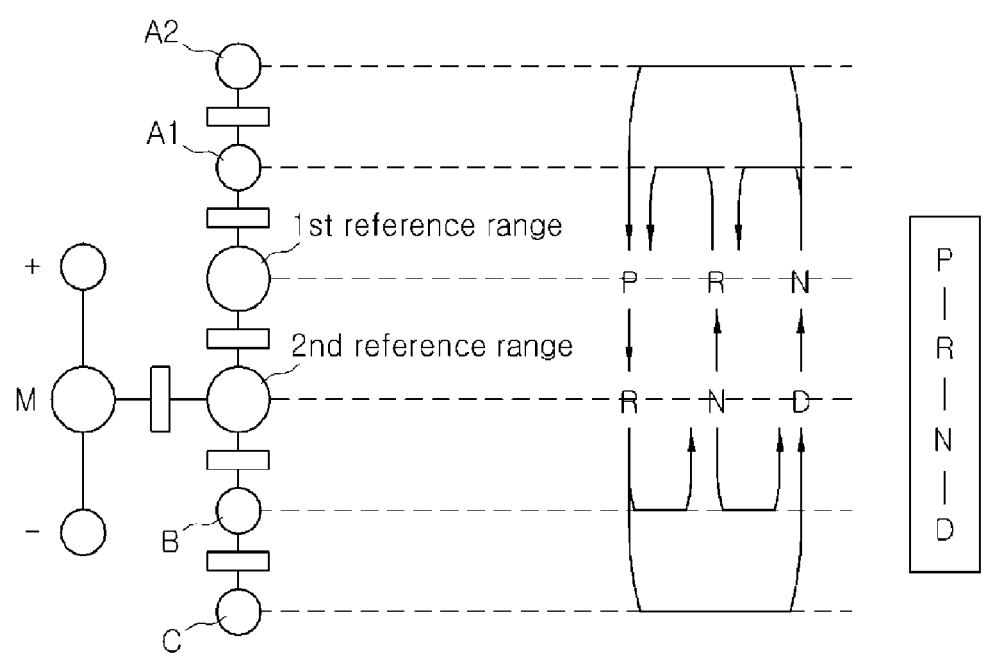
FIG. 3 is a view showing a shift pattern of an apparatus for actuating a shift lever for a vehicle according to a second embodiment of the present invention.

In the meantime, the present invention can be implemented according to various other embodiments, such as a second embodiment shown in FIG. 3. FIG. 3 is a view showing a shift pattern of an apparatus for actuating a shift lever for a vehicle according to the second embodiment of the present invention, wherein the shift lever 100 can be moved forward further by one additional stage range. According to the second embodiment, the shift lever 100 can be moved by two stage ranges in the forward and rearward directions, respectively (in FIG. 2, up to A2 range in the forward direction), so that the shift lever 100 can be moved along total 6 range stages.

Although the shift pattern has total 6 range stages, the distance between adjacent range stages is sufficient, relative to the mounting space of the shift lever 100, so that a shift error does not occur. Further, since the shift lever can move forward by 2 range stages, when the shift lever 100 is located at the second reference range in a state being gear-shifted to the D range, the shift to the P range can be performed by 3 range stage-movements of the shift lever 100. Thus, the shift to the P range can be conducted advantageously even with the stage movement of the shift lever 100 even when the parking switch 400 is not operated. Matching between the other shift ranges and their own stages is the same as in the first embodiment.

According to the apparatus for actuating the shift lever for a vehicle, the shift pattern thereof can be set to the same shift pattern as in a conventional mechanical shift lever, allowing a driver to correctly actuate the shift lever and therefore improving the operability of the apparatus. Further, the shift lever may have 5 to 6 operable range stages so that the distance between range stages can be enlarged within the same space, considerably reducing occurrence of a shift error.

For convenience in explanation and accurate definition in the appended claims, the terms "forward" or "rearward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for actuating a shift lever for a vehicle, the apparatus comprising:
   a shift pattern unit having two reference ranges in series, at which a position of the shift lever is fixed, and a passageway connecting the reference ranges for the shift lever to move;
   a driving unit providing restoration force to the shift lever to selectively return the shift lever to one of the reference ranges when the shift lever is located on the passageway outside of the reference ranges,
   wherein the reference ranges include:
      a first reference range serving as a parking range; and a second reference range connected with the first reference range, and
wherein the passageway includes:
a forward passageway connected with the first reference range and along which the shift lever is able to move forward by one range stage; and
a rearward passageway connected with the second reference range and along which the shift lever is able to move rearward by two range stages.

2. The apparatus according to claim 1, further comprising:
a parking switch to be manipulated by a user; and
a control unit controlling the driving unit to forcedly move the shift lever to any one of the two reference ranges with an operation of the driving unit when the parking switch is manipulated.

3. The apparatus according to claim 2, wherein when the shift of the gear is completed by an operation of the parking switch while the shift lever is positioned at the first reference range, the control unit controls the driving unit to move the shift lever forward by one range stage followed by moving the shift lever to the first reference range.

4. The apparatus according to claim 1, wherein while moving along the forward passageway, the shift lever is returned to the first reference range by the driving unit, and while moving along the rearward passageway, the shift lever is returned to the second reference range by the driving unit.

5. The apparatus according to claim 1, wherein the forward passageway is configured such that the shift lever is able to move forward further by an additional range stage.

6. The apparatus according to claim 1, wherein the shift pattern unit further has a manual range connected with the second reference range apart from the rearward passageway and along which the shift lever is able to move laterally by one range stage to enter a manual shift mode.

7. The apparatus according to claim 6, wherein when positioned at any one range of the first and second reference ranges and the manual range, the shift lever is moved to the first reference range by the driving unit when the parking switch is manipulated.

8. The apparatus according to claim 1, wherein when the shift of the gear is completed by an operation of the parking switch while the shift lever is positioned at the first reference range, the control unit controls the driving unit to move the shift lever forward by one range stage followed by moving the shift lever to the first reference range.

9. An apparatus for actuating a shift lever for a vehicle, the apparatus comprising:
a shift pattern unit having two reference ranges in series, at which a position of the shift lever is fixed, and a passageway connecting the reference ranges for the shift lever to move;
a driving unit providing restoration force to the shift lever to selectively return the shift lever to one of the reference ranges when the shift lever is located on the passageway outside of the reference ranges;
a parking switch to be manipulated by a user; and
a control unit controlling the driving unit to forcedly move the shift lever to any one of the two reference ranges with an operation of the driving unit when the parking switch is manipulated.

10. The apparatus according to claim 9, wherein the reference ranges include:
a first reference range serving as a parking range; and
a second reference range connected with the first reference range.

11. The apparatus according to claim 10, wherein the passageway includes:
a forward passageway connected with the first reference range and along which the shift lever is able to move forward by one range stage; and
a rearward passageway connected with the second reference range and along which the shift lever is able to move rearward by two range stages.

12. The apparatus according to claim 11, wherein while moving along the forward passageway, the shift lever is returned to the first reference range by the driving unit, and while moving along the rearward passageway, the shift lever is returned to the second reference range by the driving unit.

13. The apparatus according to claim 11, wherein the forward passageway is configured such that the shift lever is able to move forward further by an additional range stage.

14. The apparatus according to claim 11, wherein the shift pattern unit further has a manual range connected with the second reference range apart from the rearward passageway and along which the shift lever is able to move laterally by one range stage to enter a manual shift mode.

15. The apparatus according to claim 14, wherein when positioned at any one range of the first and second reference ranges and the manual range, the shift lever is moved to the first reference range by the driving unit when the parking switch is manipulated.

16. The apparatus according to claim 9, wherein when the shift of the gear is completed by an operation of the parking switch while the shift lever is positioned at the first reference range, the control unit controls the driving unit to move the shift lever forward by one range stage followed by moving the shift lever to the first reference range.

17. The apparatus according to claim 11, wherein when the shift of the gear is completed by an operation of the parking switch while the shift lever is positioned at the first reference range, the control unit controls the driving unit to move the shift lever forward by one range stage followed by moving the shift lever to the first reference range.

\* \* \* \* \*